US011823823B2

(12) United States Patent
Nishio et al.

(10) Patent No.: US 11,823,823 B2
(45) Date of Patent: Nov. 21, 2023

(54) FERRITE PARTICLES FOR BONDED MAGNETS, RESIN COMPOSITION FOR BONDED MAGNETS, AND MOLDED PRODUCT USING THE SAME

(71) Applicant: TODA KOGYO CORP., Hiroshima (JP)

(72) Inventors: Yasushi Nishio, Otake (JP); Hiromitsu Sakurai, Otake (JP); Norihiro Fukushina, Otake (JP); Yasuhiko Fujii, Otake (JP)

(73) Assignee: TODA KOGYO CORPORATION, Hiroshima (JP)

(*) Notice: Subject to any disclaimer, the term of this patent is extended or adjusted under 35 U.S.C. 154(b) by 0 days.

(21) Appl. No.: 17/984,519

(22) Filed: Nov. 10, 2022

(65) Prior Publication Data

US 2023/0078224 A1    Mar. 16, 2023

Related U.S. Application Data

(63) Continuation of application No. 15/025,599, filed as application No. PCT/JP2014/076066 on Sep. 30, 2014, now abandoned.

(30) Foreign Application Priority Data

Oct. 2, 2013    (JP) ................. 2013-207305

(51) Int. Cl.
| | | |
|---|---|---|
| *H01F 1/11* | (2006.01) | |
| *C04B 35/626* | (2006.01) | |
| *H01F 1/03* | (2006.01) | |
| *C01G 49/00* | (2006.01) | |
| *H01F 1/113* | (2006.01) | |
| *C04B 35/26* | (2006.01) | |
| *C04B 35/634* | (2006.01) | |
| *C08K 3/22* | (2006.01) | |

(52) U.S. Cl.
CPC ......... *H01F 1/0306* (2013.01); *C01G 49/009* (2013.01); *C01G 49/0036* (2013.01); *C01G 49/0063* (2013.01); *C04B 35/26* (2013.01); *C04B 35/6261* (2013.01); *C04B 35/62645* (2013.01); *C04B 35/634* (2013.01); *C08K 3/22* (2013.01); *H01F 1/113* (2013.01); *C01P 2004/20* (2013.01); *C01P 2004/22* (2013.01); *C01P 2004/61* (2013.01); *C01P 2004/62* (2013.01); *C01P 2006/10* (2013.01); *C01P 2006/11* (2013.01); *C01P 2006/12* (2013.01); *C01P 2006/42* (2013.01); *C04B 2235/3201* (2013.01); *C04B 2235/3213* (2013.01); *C04B 2235/3409* (2013.01); *C04B 2235/5436* (2013.01); *C04B 2235/5445* (2013.01); *C04B 2235/6022* (2013.01); *C04B 2235/77* (2013.01); *C08K 2003/2206* (2013.01); *C08K 2003/2265* (2013.01)

(58) Field of Classification Search
CPC ....... H01F 1/0306; H01F 1/113; C04B 35/26; C04B 35/6261; C04B 35/62645; C04B 2235/3213; C04B 2235/5436; C04B 2235/5445; C04B 2235/6022; C04B 2235/77; C01G 49/0036; C01G 49/09; C08K 3/22; C08K 2003/2206; C08K 2003/2265; C01P 2004/20; C01P 2004/61; C01P 2006/10; C01P 2006/11; C01P 2006/42
See application file for complete search history.

(56) References Cited

U.S. PATENT DOCUMENTS

| | | | |
|---|---|---|---|
| 3,036,008 A | 5/1962 | Godshalk | |
| 4,042,516 A | 8/1977 | Matsumoto et al. | |
| 5,328,793 A | 7/1994 | Misawa et al. | |
| 5,578,670 A | 11/1996 | Nakazawa et al. | |
| 5,599,627 A | 2/1997 | Aoki et al. | |
| 6,017,631 A | 1/2000 | Yamamoto et al. | |
| 6,099,957 A * | 8/2000 | Yamamoto ......... | G11B 5/70678 428/407 |

(Continued)

FOREIGN PATENT DOCUMENTS

| | | |
|---|---|---|
| CN | 101345110 | 1/2009 |
| DE | 40 41 962 | 6/1992 |

(Continued)

OTHER PUBLICATIONS

International Search Report for PCT/JP2014/076066 dated Jan. 13, 2015, 4 pages.
International Preliminary Report on Patentability issued in App. No. PCT/JP2014/076066 dated Apr. 5, 2016.
Extended European Search Report issued in Application No. 13767468.5 dated Nov. 5, 2015.
International Preliminary Examination Report in PCT/JP2013/057213 dated Oct. 9, 2014.
International Search Report for PCT/JP2013/057213 dated Jun. 4, 2013.

(Continued)

*Primary Examiner* — Matthew E. Hoban
*Assistant Examiner* — Lynne Edmondson
(74) *Attorney, Agent, or Firm* — Nixon & Vanderhye P.C.

(57) ABSTRACT

According to the present invention, there are provided ferrite particles for bonded magnets and a resin composition for bonded magnets which are capable of producing a bonded magnet molded product having a good tensile elongation and exhibiting excellent magnetic properties, as well as a bonded magnet molded product such as a rotor which is obtained by using the resin composition. The present invention relates to ferrite particles for bonded magnets having a bulk density of not less than 0.5 g/cm$^3$ and less than 0.6 g/cm$^3$ and a degree of compaction of not less than 65%, a resin composition for bonded magnets using the ferrite particles, and a molded product obtained by using the ferrite particles and the resin composition.

4 Claims, No Drawings

(56) References Cited

U.S. PATENT DOCUMENTS

| | | | |
|---|---|---|---|
| 6,383,407 | B2 | 5/2002 | Ogata et al. |
| 6,402,980 | B1 | 6/2002 | Taguchi et al. |
| 6,511,733 | B2 | 1/2003 | Hayashi et al. |
| 6,872,325 | B2 | 3/2005 | Bandyopadhyay et al. |
| 8,741,170 | B2 | 6/2014 | Fujii et al. |
| 9,691,528 | B2 * | 6/2017 | Nishio ............. H01F 1/01 |
| 10,497,498 | B2 * | 12/2019 | Nishio ............. H01F 1/11 |
| 2002/0005603 | A1 | 1/2002 | Tabuchi et al. |
| 2002/0168523 | A1 | 11/2002 | Uchida et al. |
| 2004/0028592 | A1 | 2/2004 | Akimoto et al. |
| 2004/0094742 | A1 | 5/2004 | Kawano et al. |
| 2004/0241394 | A1 | 12/2004 | Burrows |
| 2006/0284136 | A1 | 12/2006 | Takami et al. |
| 2009/0218540 | A1 | 9/2009 | Takami et al. |
| 2009/0242164 | A1 | 10/2009 | Gotoh et al. |
| 2010/0028796 | A1 | 2/2010 | Nakamura et al. |
| 2010/0065771 | A1 * | 3/2010 | Fujii ............. H01F 1/113 428/402 |
| 2010/0124644 | A1 | 5/2010 | Hein et al. |
| 2010/0295643 | A1 | 11/2010 | Nakaue et al. |
| 2012/0015189 | A1 | 1/2012 | Suenaga et al. |
| 2014/0225023 | A1 | 8/2014 | Fujii et al. |
| 2015/0041702 | A1 | 2/2015 | Nishio et al. |
| 2016/0039128 | A1 | 2/2016 | Nishio et al. |

FOREIGN PATENT DOCUMENTS

| | | |
|---|---|---|
| EP | 0 540 278 | 5/1993 |
| EP | 0 652 490 | 5/1995 |
| EP | 0 863 501 | 9/1998 |
| EP | 1 090 884 | 4/2001 |
| EP | 1 170 757 | 1/2002 |
| EP | 1 981 004 | 10/2008 |
| EP | 2 833 377 | 2/2015 |
| JP | 55-145303 | 11/1980 |
| JP | 61-191004 | 8/1986 |
| JP | 62-273573 | 11/1987 |
| JP | 63-55122 | 3/1988 |
| JP | 3-218606 | 9/1991 |
| JP | 5-144622 | 6/1993 |
| JP | 6-163237 | 6/1994 |
| JP | 6-244047 | 9/1994 |
| JP | 8-115809 | 5/1996 |
| JP | 9-106904 | 4/1997 |
| JP | 2000-223307 | 8/2000 |
| JP | 2000-357606 | 12/2000 |
| JP | 2001-28305 | 1/2001 |
| JP | 2002-29829 | 1/2002 |
| JP | 2002-308629 | 10/2002 |
| JP | 2003-207950 | 7/2003 |
| JP | 2005-268729 | 9/2005 |
| JP | 2007-214510 | 8/2007 |
| JP | 2008-160052 | 7/2008 |
| JP | 2008-277792 | 11/2008 |
| JP | 2009-176960 | 8/2009 |
| JP | 2009-252906 | 10/2009 |
| JP | 2010-263201 | 11/2010 |
| KR | 2008-0089226 | 10/2008 |
| WO | WO 2009/041606 | 4/2009 |
| WO | WO 2013/146299 | 10/2013 |

OTHER PUBLICATIONS

Extended European Search Report issued in App. No. 14850524.1 dated Mar. 14, 2017.
Ozkän et al., "The Effect of $B_2O_3$ Addition on the Direct Sintering of Barium Hexaferrite," *Journal of the European Ceramic Society*, vol. 14: 351-358 (1994).
Extended European Search Report issued in App. No. 14778820.2 dated Sep. 26, 2016.
European Search Report for EP Application No. 08 25 1141 dated Oct. 7, 2008.
International Preliminary Report on Patentability issued in PCT/JP2014/059641 dated Oct. 6, 2015.
International Search Report for PCT/JP2014/059641, dated Jul. 1, 2014, 4 pages.
Office Action and English language translation of Office Action in JP 2008-088151 dated May 9, 2012.
U.S. Office Action issued in U.S. Appl. No. 14/781,777 dated Mar. 22, 2018.

* cited by examiner

FERRITE PARTICLES FOR BONDED MAGNETS, RESIN COMPOSITION FOR BONDED MAGNETS, AND MOLDED PRODUCT USING THE SAME

This application is a continuation of U.S. application Ser. No. 15/025,599, filed Mar. 29, 2016, which is the U.S. national phase of International Application No. PCT/JP2014/076066 filed Sep. 30, 2014, which designated the U.S. and claims priority to JP Patent Application No. 2013-207305 filed Oct. 2, 2013, the entire contents of each of which are hereby incorporated by reference.

TECHNICAL FIELD

The present invention relates to ferrite particles for bonded magnets and a resin composition for bonded magnets which are capable of producing a bonded magnet molded product having a good tensile elongation, as well as a bonded magnet molded product such as a rotor, which is obtained using the ferrite particles and the resin composition.

BACKGROUND ART

As well known in the art, bonded magnets have many advantages such as light weight, good dimensional accuracy, and facilitated mass-production of molded products having even a complicated shape as compared to sintered magnets, and, therefore, have been extensively used in various applications such as toys, office equipments, audio equipments and motors.

As the magnetic particles usable in the bonded magnets, there are known rare earth element magnet particles such as typically Nd—Fe—B-based alloy particles, and ferrite particles. The rare earth element magnet particles have high magnetic properties, but are expensive, resulting in limited applications thereof. On the other hand, the ferrite particles are somewhat deteriorated in magnetic properties as compared to the rare earth element magnet particles, but are inexpensive and chemically stable and, therefore, have been used in more extensive applications.

The bonded magnets have been usually produced by kneading a rubber or a plastic material with magnetic particles and then molding the resulting kneaded material in a magnetic field or by using a mechanical means.

In recent years, with the enhancement in performance of various materials or equipments including an improved reliability, there is also an increasing demand for a high performance of bonded magnets used therein including enhancement in strength and magnetic properties of the bonded magnets.

More specifically, the bonded magnet molded products obtained by injection molding, etc., are also required to exhibit a good mechanical strength capable of withstanding severe conditions when used in various applications.

For example, in the applications of motors in which a rotating rotor having a shaft is used, since the shaft is inserted into the rotor machined into various sizes and complicated shapes, the rotor is required to have a high tensile elongation characteristic. With respect to the magnetic properties of the rotor, there have been required not only an increased magnetization level of a surface magnetic force but also a less degree of demagnetization induced owing to a magnetic field generated by a current supplied to a coil, in particular, as an important factor technology for obtaining high-performance motor characteristics.

For this reason, ferrite particles used in the bonded magnets as well as resin compositions for the bonded magnets which comprise the ferrite particles and an organic binder are also required to satisfy the above requirements.

Conventionally, ferrite particles for bonded magnets and resin compositions for bonded magnets which comprise the ferrite particles and the organic binder have been improved variously. For example, there are known the method of producing ferrite particles by using an alkali metal compound or an alkali earth metal compound as a flux (Patent Literature 1); the method of controlling a particle size distribution of ferrite particles (Patent Literature 2); the method of producing a bonded magnet using ferrite magnetic particles comprising an alkali earth metal as a constituting component and having an average particle diameter of not less than 1.50 μm and a melt flow rate of not less than 91 g/10 min (Patent Literature 3); the method of controlling properties of compacted calcined particles obtained by producing particles having an average particle diameter of not more than 2.5 μm and a specific surface area of not less than 1.25 m²/g and then subjecting the resulting particles to annealing and further to compaction, so as to satisfy the conditions of Ra<2.5 μm and Ra−Da<0.5 μm wherein Ra (μm) represents an average particle diameter of the particles as measured by a dry air dispersion laser diffraction method, and Da (μm) represents a specific surface area diameter of the particles as measured by an air permeability method (Patent Literature 4); the method of obtaining a ferrite having a large particle diameter, a clear crystal structure, a coercive force that is hardly reduced even when pressed, and an energy product of not less than 2.0 MGOe by mixing a ferrite calcined at a temperature of 1050 to 1300° C. in the saturated vapor pressure of a chloride with ferrite fine particles having a small particle diameter, and annealing the resulting mixture at a temperature of 800 to 1100° C. (Patent Literature 5); or the like.

CITATION LIST

Patent Literature

Patent Literature 1: Japanese Patent Application Laid-Open (KOKAI) No. 55-145303(1980)
Patent Literature 2: Japanese Patent Application Laid-Open (KOKAI) No. 3-218606(1991)
Patent Literature 3: Japanese Patent Application Laid-Open (KOKAI) No. 2005-268729
Patent Literature 4: Japanese Patent Application Laid-Open (KOKAI) No. 2007-214510
Patent Literature 5: Japanese Patent Application Laid-Open (KOKAI) No. 2010-263201

SUMMARY OF INVENTION

Technical Problem

At the present time, the ferrite particles for bonded magnets and/or the resin compositions for bonded magnets which are capable of satisfying the above requirements have been strongly required. However, the ferrite particles and/or resin compositions capable of satisfying the above requirements to a sufficient extent have not been obtained until now.

That is, the bonded magnet molded products produced by using the ferrite particles or resin compositions for bonded magnets as described in the above Patent Literatures 1 to 5 have failed to provide those products which are excellent in all of high magnetic force, demagnetization resistance against an external magnetic field, and mechanical strength.

In consequence, an object or technical task of the present invention is to provide ferrite particles for bonded magnets and a resin composition for bonded magnets which are capable of producing a bonded magnet that is excellent in high magnetic force, demagnetization resistance against an external magnetic field, and mechanical strength.

Solution to Problem

The above object or technical task of the present invention can be achieved by the following aspects of the present invention.

That is, according to the present invention, there are provided ferrite particles for bonded magnets, having a bulk density of not less than 0.50 g/cm$^3$ and less than 0.60 g/cm$^3$ and a degree of compaction of not less than 65% (Invention 1).

Also, according to the present invention, there are provided the ferrite particles for bonded magnets as described in the above Invention 1, wherein the ferrite particles have an average particle diameter of 0.9 to 3.0 μm (Invention 2).

Also, according to the present invention, there are provided the ferrite particles for bonded magnets as described in the above Invention 1 or 2, wherein the ferrite particles are magnetoplumbite-type ferrite particles (Invention 3).

In addition, according to the present invention, there is provided a resin composition for bonded magnets, comprising 83 to 93% by weight of the ferrite particles for bonded magnets as described in any one of the above Inventions 1 to 3, and 7 to 17% by weight of an organic binder component (Invention 4).

Further, according to the present invention, there is provided a molded product comprising the ferrite particles for bonded magnets as described in any one of the above Inventions 1 to 3, or the resin composition for bonded magnets as described in the above Invention 4 (Invention 5).

Also, according to the present invention, there is provided the molded product as described in the above Invention 5, wherein the molded product is a rotor (Invention 6).

Advantageous Effects of Invention

The ferrite particles for bonded magnets according to the present invention which are controlled in their properties such that the bulk density thereof is not less than 0.50 g/cm$^3$ and less than 0.60 g/cm$^3$, and the degree of compaction thereof is not less than 65%, are magnetic particles having an excellent dispersibility in an organic binder, and therefore can be suitably used as magnetic particles for bonded magnets.

The resin composition for bonded magnets according to the present invention comprises the ferrite particles for bonded magnets, an organic binder, a silane coupling agent, etc., and is capable of producing a molded product having excellent strength and magnetic properties and, therefore, can be suitably used as a resin composition for bonded magnets.

The resin composition for bonded magnets according to the present invention has an excellent tensile elongation and therefore can be suitably used for a rotor.

DESCRIPTION OF EMBODIMENTS

The present invention is described in detail below.

First, the ferrite particles for bonded magnets according to the present invention (hereinafter referred to merely as "ferrite particles") are explained.

The composition of the ferrite particles according to the present invention is not particularly limited as long as they are in the form of a magnetoplumbite-type ferrite, and may be either Sr-based ferrite particles or Ba-based ferrite particles. In addition, the ferrite particles may also comprise different kinds of elements such as La, Nd, Pr, Co and Zn.

The bulk density of the ferrite particles according to the present invention is not less than 0.5 g/cm$^3$ and less than 0.6 g/cm$^3$. When the bulk density of the ferrite particles is controlled in the above-specified range, a bonded magnet produced using the ferrite particles can exhibit an excellent tensile elongation. It may be difficult to industrially produce ferrite particles having a bulk density of less than 0.50 g/cm$^3$. When the bulk density of the ferrite particles is more than 0.60 g/cm$^3$, even though the degree of compaction of the ferrite particles is not less than 65%, such ferrite particles tend to be deteriorated in coercive force despite of an excellent dispersibility thereof in a resin. The bulk density of the ferrite particles is preferably 0.51 to 0.59 g/cm$^3$.

The degree of compaction of the ferrite particles according to the present invention is not less than 65%. When the degree of compaction of the ferrite particles is less than 65%, the resulting composition comprising the ferrite particles compounded therein tends to be hardly bit in a kneader owing to a large volume of voids in the particles, resulting in poor packing properties of the ferrite particles. The degree of compaction of the ferrite particles is preferably 66 to 75%. Meanwhile, the degree of compaction of the ferrite particles is defined by the method described in the below-mentioned Examples.

The average particle diameter of the ferrite particles according to the present invention is preferably 0.9 to 3.0 μm. When the average particle diameter of the ferrite particles is out of the above-specified range of 0.9 to 3.0 μm, the ferrite particles tend to be hardly packed with a high density when being formed into a bonded magnet, so that it may be difficult to produce a bonded magnet having high magnetic properties. The average particle diameter of the ferrite particles is more preferably 0.9 to 2.5 μm and even more preferably 0.95 to 2.0 μm.

The BET specific surface area value of the ferrite particles according to the present invention is preferably 1.4 to 2.5 m$^2$/g.

The particle shape of the ferrite particles according to the present invention is a generally hexagonal plate shape. The average thickness of the ferrite particles according to the present invention as observed by a scanning electron microscope is preferably 0.2 to 1.0 μm. When the average thickness of the ferrite particles is out of the above-specified range, the resulting ferrite particles tend to be hardly packed with a high density when being formed into a bonded magnet, so that it may be difficult to produce a bonded magnet having high magnetic properties. The average thickness of the ferrite particles is more preferably 0.3 to 1.0 μm and even more preferably 0.4 to 0.7 μm.

The plate shape ratio (plate surface diameter/thickness) of the ferrite particles according to the present invention is expressed by a ratio between an average plate surface diameter and an average thickness both measured by observation using a scanning electron microscope, and is preferably 1.0 to 10.

The saturation magnetization value σs of the ferrite particles according to the present invention is preferably 65.0 to 73.0 Am$^2$/kg (65.0 to 73.0 emu/g), and the coercive force Hc of the ferrite particles is preferably 206.9 to 279 kA/m (2600 to 3500 Oe). In addition, Br of the ferrite particles is preferably 160 to 200 mT (1600 to 2000 G).

Next, the process for producing the ferrite particles according to the present invention is described.

The ferrite particles according to the present invention may be produced by blending and mixing raw material particles at a predetermined mixing ratio; calcining the resulting mixed raw material particles at a temperature of 900 to 1250° C. in atmospheric air and further subjecting the particles to pulverization and washing with water; and then subjecting the resulting particles to annealing heat treatment at a temperature of 700 to 1100° C. in atmospheric air, followed by subjecting the obtained particles to compaction, grinding and finally deaggregation treatments.

The raw material particles may be appropriately selected from particles of oxides, hydroxides, carbonates, nitrates, sulfates, chlorides, etc., of various metals which are capable of forming a magnetoplumbite-type ferrite. Meanwhile, from the standpoint of improving reactivity of the raw material particles upon calcining, the particle diameter of the raw material particles is preferably not more than 2.0 µm.

In addition, in the present invention, the mixed raw material particles are preferably calcined by adding a flux thereto. As the flux, there may be used various fluxes. Examples of the flux include $SrCl_2 \cdot 6H_2O$, $CaCl_2 \cdot 2H_2O$, $MgCl_2$, KCl, NaCl, $BaCl_2 \cdot 2H_2O$ and $Na_2B_4O_7$. The amount of the respective fluxes added is preferably 0.1 to 10 parts by weight and more preferably 0.1 to 8.0 parts by weight on the basis of 100 parts by weight of the mixed raw material particles.

Also, in the present invention, $Bi_2O_3$ may be added and mixed in the mixed raw material particles or the particles obtained by calcining and then pulverizing the raw material particles.

Meanwhile, in the present invention, from the standpoint of well controlling the particle size distribution or mean volume diameter, larger particles and smaller particles may be used in the form of a mixture thereof.

The compaction and grinding treatments are conducted by rolling two heavy rollers on a stationary horizontal disk. These treatments are conducted by using compaction and grinding actions of the rollers, whereby voids in the particles are reduced, and the particles are compacted into an aggregated condition. Examples of the treatment apparatus usable in the compaction and grinding treatments include a sand mill, an edge runner, an attritor and a roller mill.

The deaggregation treatment as the final treatment is a treatment in which the compacted aggregated particles produced by the compaction and grinding treatments are dispersed or deaggregated by applying a relatively small force thereto to break aggregation of the particles. The deaggregation treatment may be conducted by using an impact-type crusher such as a hammer mill and a pin mill. Meanwhile, the impact-type crusher may be equipped therein with a classification mechanism such as a screen.

The ferrite particles according to the present invention are required to have a bulk density of not less than 0.5 $g/cm^3$ and less than 0.6 $g/cm^3$ and a degree of compaction of not less than 65%. In order to obtain such ferrite particles, in the aforementioned process for producing the ferrite particles, the compaction and grinding treatments are conducted, and further the deaggregation treatment may be conducted after the compaction and grinding treatments, such that the bulk density and the degree of compaction of the ferrite particles lie in the above-specified range. For example, in the case where the compaction and grinding treatments are not conducted, the degree of compaction of the ferrite particles tends to be hardly enhanced. By appropriately combining these requirements with each other, the bulk density and the degree of compaction of the ferrite particles can be adjusted to lie in the aforementioned range of the present invention.

Next, the resin composition for bonded magnets using the ferrite particles according to the present invention is described.

The resin composition for bonded magnets according to the present invention can be produced by mixing and kneading the ferrite particles with an organic binder component and a silane coupling agent component such that the amount of the ferrite particles contained in the resin composition for bonded magnets is 83 to 93 parts by weight, and the total amount of the organic binder component and the silane coupling agent component contained in the resin composition for bonded magnets is 17 to 7 parts by weight. When the amount of the ferrite particles contained in the resin composition for bonded magnets is less than 83 parts by weight, the resulting bonded magnet tends to fail to have desired magnetic properties. When the amount of the ferrite particles contained in the resin composition for bonded magnets is more than 93 parts by weight, the resin composition tends to be deteriorated in fluidity and therefore tends to be hardly molded, and further tends to fail to have a good dispersion condition due to the poor moldability, resulting in deteriorated magnetic properties of the resulting bonded magnet.

The organic binder used in the present invention is not particularly limited as long as it may be usually used in conventional bonded magnets. The organic binder usable in the present invention may be appropriately selected from rubbers, vinyl chloride resins, ethylene-vinyl acetate copolymer resins, ethylene-ethyl acrylate copolymer resins, PPS resins, polyamide (nylon) resins, polyamide elastomers and polymeric fatty acid-based polyamides, according to the applications thereof. Among these organic binders, in the case where it is intended to preferentially achieve good strength and rigidity of the resulting molded product, the polyamide resins are more suitably used. In addition, if required, a known mold release agent such as zinc stearate and calcium stearate may be added to the organic binder.

In the present invention, as the silane coupling agent, there may be used those silane coupling agents comprising, as functional groups, any one of a vinyl group, an epoxy group, an amino group, a methacryl group and a mercapto group, and any one of a methoxy group and an ethoxy group. Among these silane coupling agents, preferred are those silane coupling agents comprising an amino group and a methoxy group or those silane coupling agents comprising an amino group and an ethoxy group.

The resin composition for bonded magnets according to the present invention has a residual magnetic flux density Br of preferably not less than 230 mT (2300 G) and more preferably not less than 235 mT (2350 G), a coercive force iHc of preferably 206.9 to 278.5 kA/m (2600 to 3500 Oe) and more preferably 214.9 to 262.6 kA/m (2700 to 3300 Oe), and a maximum energy product BHmax of preferably not less than 10.3 $kJ/m^3$ (1.30 MGOe) and more preferably not less than 10.7 $kJ/m^3$ (1.35 MGOe), as measured by the below-mentioned methods for measuring magnetic properties.

Next, the process for producing the resin composition for bonded magnets by using the ferrite particles, the resin binder and the silane coupling agent according to the present invention is described.

The resin composition for bonded magnets according to the present invention may be produced by any suitable known processes used for producing the conventional resin compositions for bonded magnets. For example, the silane coupling agent, etc., may be added to and uniformly mixed with the ferrite particles according to the present invention, and then the organic binder component may be further uniformly mixed with the resulting mixture. Thereafter, the thus obtained mixture is melted and kneaded using a kneading extruder, etc., and the resulting kneaded material is pulverized or cut into granules or pellets.

The amount of the silane coupling agent added is 0.15 to 3.5 parts by weight and preferably 0.2 to 3.0 parts by weight on the basis of 100 parts by weight of the ferrite particles according to the present invention.

Next, the test piece molded product for evaluation of a tensile elongation according to the present invention is described.

The test piece molded product may be produced by the following method. That is, the ferrite magnetic particles for bonded magnets, the organic binder component, etc., are previously uniformly mixed with each other, and/or melted and kneaded after being mixed together, and then pulverized or cut into pellets to prepare a resin composition for bonded magnets. The resulting resin composition is injected while being kept in a molten state into a cavity of a metal mold at 80° C., thereby obtaining the test piece molded product having an overall length of 175 mm, an overall width of 12.5 mm and a thickness of 3.2 mm.

The resin composition for bonded magnets according to the present invention is excellent in moldability, especially in injection moldability. The melt mass flow rate (MFR) of the resin composition for bonded magnets according to the present invention as measured by the method described in the below-mentioned Examples is preferably not more than 30 g/10 min, and more preferably 35 to 100 g/10 min. The molding density of a molded product produced from the resin composition for bonded magnets according to the present invention is preferably 3.00 to 3.90 g/cm$^3$.

The resin composition for bonded magnets according to the present invention is excellent in tensile elongation. The tensile strength of the resin composition for bonded magnets according to the present invention as measured by the method described in the below-mentioned Examples (in the case where the resin is a 12-nylon resin) is preferably 40 to 70 MPa, and the tensile elongation thereof as measured by the method described in the below-mentioned Examples (in the case where the resin is a 12-nylon resin) is preferably not less than 3% and more preferably 6 to 10%. Further, the resin composition for bonded magnets according to the present invention is excellent in mechanical strength, and is preferably free from being broken even when subjected to impact test using the IZOD impact strength as measured by the method described in the below-mentioned Examples (in the case where the resin is a 12-nylon resin). Furthermore, the resin composition for bonded magnets according to the present invention is excellent in dimensional stability, and the shrinkage rate thereof as measured by the method described in the below-mentioned Examples (in the case where the resin is a 12-nylon resin) is preferably not more than 0.68% and more preferably not more than 0.65%.

<Function>

The reason why the molded product produced from the ferrite particles and/or the resin composition for bonded magnets according to the present invention can exhibit an excellent tensile elongation by controlling a bulk density of the ferrite particles to not less than 0.5 g/cm$^3$ and less than 0.6 g/cm$^3$ and a degree of compaction thereof to not less than 65%, respectively, is considered by the present inventors as follows, although it is not clearly determined yet.

That is, it is considered that by controlling a bulk density of the ferrite particles according to the present invention to not less than 0.5 g/cm$^3$ and less than 0.6 g/cm$^3$ and a degree of compaction thereof to not less than 65%, respectively, the resin mixture having good packing properties can be readily bit by a kneader and adequately loaded with an initial torque so that the ferrite particles are kept in an ideal dispersion condition in the organic binder.

It is considered that since the resin composition for bonded magnets according to the present invention comprises 83 to 93% by weight of the above ferrite particles for bonded magnets and 7 to 17% by weight of the organic binder component, the ferrite particles and the organic binder can be held in the resin composition under a uniform and ideal dispersion condition.

EXAMPLES

The typical examples of the present invention are described below.

The average particle diameter (Ps) of the ferrite particles according to the present invention was measured using a "powder specific surface area measuring apparatus SS-100" manufactured by Shimadzu Corp.

The BET specific surface area of the ferrite particles according to the present invention was measured using a "fully-automatic specific surface area analyzer Macsorb model-1201" manufactured by Mountech Co., Ltd.

The bulk density of the ferrite particles according to the present invention was measured according to JIS K 2101-12-1.

The tap density of the ferrite particles according to the present invention was measured according to JIS K 5101-12-2.

The degree of compaction of the ferrite particles according to the present invention was calculated according to the following formula.

Degree of compaction=(tap density−bulk density)/tap density×100(%)

The saturation magnetic flux density Br and the coercive force iHc of the ferrite particles were determined as follows. That is, the particles were compacted by applying a pressure of 1 t/cm$^2$ thereto to obtain a compacted core, and then the magnetic properties of the thus obtained compacted core were measured in a magnetic field of 14 kOe using a "D.C. magnetization characteristic automatic recorder 3257" manufactured by Yokogawa Hokushin Denki Co., Ltd.

The melt mass flow rate (MFR) of the resin composition for bonded magnets was determined by melting the resin composition at 270° C. and measuring the MFR of the molten resin composition under a load of 10 kg, according to JIS K7210.

The molding density of a molded product produced from the resin composition for bonded magnets was determined as follows. That is, the resin composition for bonded magnets was melted and molded in a cavity of a metal mold having a diameter of 25 mmϕ and a height of 10.5 mm to form a core, and the density of the thus molded core was measured using an "electronic specific gravity meter EW-120SG" manufactured by Yasuda Seiki Seisakusho Co., Ltd.

The water content in the resin composition for bonded magnets was measured using a "trace water content analyzer AQ-7" manufactured by Hiranuma Sangyo Co., Ltd., equipped with a water vaporization device "EV-6" manufactured by Hiranuma Sangyo Co., Ltd.

The magnetic properties of the resin composition for bonded magnets (including a residual magnetic flux density Br, a coercive force iHc, a coercive force bHc and a maximum energy product BHmax) were determined as follows. That is, the resin composition for bonded magnets was melted in a cavity of a metal mold having a diameter of 25 mmφ and a height of 10.5 mm and magnetically oriented in a magnetic field of 9 kOe, and then the magnetic properties of the molten resin composition were measured in a magnetic field of 14 kOe using a "D.C. magnetization characteristic automatic recorder 3257" manufactured by Yokogawa Hokushin Denki Co., Ltd.

The injection moldability of the resin composition for bonded magnets was evaluated as follows. That is, the resin composition was molded using an injection molding machine "J20MII Model" manufactured by Nippon Seikosho Co., Ltd., to obtain a test piece molded product having an overall length of 175 mm, an overall width of 12.5 mm and a thickness of 3.2 mm. The injection pressures upon injection-molding the test piece were recorded to evaluate the injection moldability of the resin composition.

The tensile strength and elongation were measured according to ASTM D638-90 Standard. Specifically, the test piece was prepared using an injection molding machine "J20MII Model" manufactured by Nippon Seikosho Co., Ltd., and then the tensile strength and elongation of the test piece were measured using a computer-aided measurement control system precision universal tester "AG-1" manufactured by Shimadzu Corp.

The flexural strength was measured according to ASTM D790 Standard. Specifically, the test piece was prepared using an injection molding machine "J20MII Model" manufactured by Nippon Seikosho Co., Ltd., and then the flexural strength of the test piece was measured using a computer-aided measurement control system precision universal tester "AG-1" manufactured by Shimadzu Corp.

The Izod impact strength was measured according to ASTM D256 Standard. Specifically, the test piece was prepared using an injection molding machine "J20MII Model" manufactured by Nippon Seikosho Co., Ltd., and then the Izod impact strength of the test piece was measured using an Izod impact tester "No. 158" manufactured by Yasuda Seiki Seisakusho Co., Ltd.

The shrinkage rate of the test piece was determined by measuring an actual dimension of the test piece and calculating a degree of shrinkage of the test piece relative to a metal mold upon molding.

Example 1

<Production of Ferrite Particles>

Powdery α-$Fe_2O_3$ and $SrCO_3$ were weighed such that molar ratio of Fe and Sr was represented by the following relation, that is, 2Fe:Sr=5.90:1, and these particles were mixed with each other in an wet attritor for 30 min, and then subjected to filtration and drying. An aqueous solution of $SrCl_2$ and an aqueous solution of $Na_2B_4O_7$ were respectively added and intimately mixed in the thus obtained raw material mixed particles, and the resulting mixture was then granulated. At this time, the amounts of $SrCl_2$ and $Na_2B_4O_7$ added were 2.0% by weight and 0.2% by weight, respectively, based on the weight of the above raw material mixed particles. The resulting granulated product was calcined in atmospheric air at 1120° C. for 2 hr. The resulting calcined product was coarsely crushed, and then pulverized by a wet attritor for 30 min, followed by subjecting the resulting particles to washing with water, filtration and drying. Thereafter, a mixed solution of isopropyl alcohol and triethanol amine was added to the particles, and further the particles were pulverized using a vibration mil for 30 min. At this time, the mixed solution was added in such an amount that the amounts of isopropyl alcohol and triethanol amine added were 0.2% by weight and 0.1% by weight, respectively, based on the above wet-pulverized dried product. Then, the resulting pulverized product was subjected to heat treatment in atmospheric air at 950° C. for 1.5 hr. Thereafter, the resulting particles were subjected to compaction and grinding treatments using a sand mil under an applied load of 30 kg/cm for 30 min, and further subjected to deaggregation treatment using a pin mill. The production conditions used above are shown in Table 1, and properties of the obtained ferrite particles for bonded magnets are shown in Table 2.

Example 2

The same procedure as in the above Example 1 was conducted except that the composition, kinds and amounts of additives added, calcination temperature, etc., were changed variously, thereby producing ferrite particles.

The production conditions used above are shown in Table 1, and properties of the obtained ferrite particles for bonded magnets are shown in Table 2.

Comparative Examples 1 and 3

The ferrite particles obtained after the heat treatment in Examples 1 and 2 were used as ferrite particles for Comparative Examples 1 and 3, respectively. The production conditions used above are shown in Table 1, and properties of the obtained ferrite particles for bonded magnets are shown in Table 2.

Comparative Examples 2 and 4

The ferrite particles obtained after the compaction and grinding treatments in Examples 1 and 2 were used as ferrite particles for Comparative Examples 2 and 4, respectively. The production conditions used above are shown in Table 1, and properties of the obtained ferrite particles for bonded magnets are shown in Table 2.

Example 3

<Production of Resin Composition for Bonded Magnets>

The ferrite particles obtained in Example 1 were weighed in an amount of 25000 g and charged into a Henschel mixer, and an aminoalkyl-based silane coupling agent was added thereto in an amount of 0.6% by weight based on the weight of the ferrite particles and mixed with each other for 20 min until a uniform mixture was obtained. In addition, 3067 g of a 12-nylon resin having a relative viscosity of 1.60 was charged into the resulting mixture and further mixed with each other for 30 min, thereby preparing a mixture of a resin composition for bonded magnets.

The resulting mixture of the resin composition for bonded magnets was fed at a constant rate into a twin-screw kneader and kneaded therein at a temperature capable of melting the 12-nylon resin. The obtained kneaded material was taken out from the kneader in the form of strands, and cut into pellets having a size of 2 mmφ×3 mm, thereby obtaining a resin composition for bonded magnets in the form of pellets.

The production method and properties of the thus obtained resin composition for bonded magnets are shown in Table 3.

Example 4 and Comparative Examples 5 to 8

The resin composition for bonded magnets was produced by the same method as used in Example 3 except for variously changing the ferrite particles to be used.

Properties of the thus obtained resin composition for bonded magnets are shown in Table 3.

Example 5

<Molding of Test Piece Molded Product>

The resin composition for bonded magnets obtained in Example 3 was dried at 100° C. for 3 hr, melted at 300° C. in an injection molding machine, and injection-molded into a metal mold set at 80° C. for an injecting time of 0.5 sec, thereby preparing a test piece molded product having an overall length of 175 mm, an overall width of 12.5 mm and a thickness of 3.2 mm. The injection moldability and various properties of the thus prepared test piece molded product are shown in Table 4.

Example 6 and Comparative Examples 9 to 12

The same procedure as in Example 5 was conducted except for using various resin compositions for bonded magnets, thereby preparing test piece molded products. The injection moldability and various properties of the thus prepared test piece molded products are shown in Table 4.

TABLE 1

| Examples and Comparative Examples | Production of ferrite particles | | | |
|---|---|---|---|---|
| | Final treatment | 2Fe/Sr Molar ratio (—) | SrCl$_2$ (wt %) | Na$_2$B$_4$O$_7$ (wt %) |
| Example 1 | Deaggregation | 5.90 | 2 | 0.20 |
| Example 2 | Deaggregation | 5.90 | 3 | 0.30 |
| Comparative Example 1 | Heat treatment | Same as used in Example 1 | | |
| Comparative Example 2 | Compaction and grinding | Same as used in Example 1 | | |
| Comparative Example 3 | Heat treatment | Same as used in Example 2 | | |
| Comparative Example 4 | Compaction and grinding | Same as used in Example 2 | | |

| Examples and Comparative Examples | Production of ferrite particles | | | |
|---|---|---|---|---|
| | Calcination temp. (° C.) | Heat treatment (° C.) | Compaction and grinding treatments Under applied load (kg/cm) | Deaggregation treatment Done or not done |
| Example 1 | 1120 | 950 | 30 | Done |
| Example 2 | 1140 | 950 | 30 | Done |
| Comparative Example 1 | Same as used in Example 1 | | — | Not done |
| Comparative Example 2 | Same as used in Example 1 | | 30 | Not done |
| Comparative Example 3 | Same as used in Example 2 | | — | Not done |
| Comparative Example 4 | Same as used in Example 2 | | 30 | Not done |

TABLE 2

| Examples and Comparative Examples | Properties of ferrite particles | | | | |
|---|---|---|---|---|---|
| | Bulk density (g/cm$^3$) | Tap density (g/cm$^3$) | Degree of compaction (%) | Ps (μm) | BET (m$^2$/g) |
| Example 1 | 0.51 | 1.72 | 70.35 | 1.08 | 2.25 |
| Example 2 | 0.57 | 2.00 | 71.50 | 1.15 | 2.09 |
| Comparative Example 1 | 0.66 | 1.68 | 60.71 | 1.08 | 2.08 |
| Comparative Example 2 | 0.67 | 1.87 | 64.17 | 1.17 | 2.14 |
| Comparative Example 3 | 0.72 | 1.92 | 62.50 | 1.17 | 1.95 |
| Comparative Example 4 | 0.73 | 2.07 | 64.73 | 1.25 | 2.01 |

| Examples and Comparative Examples | Magnetic properties | | | |
|---|---|---|---|---|
| | Br | | iHc | |
| | (mT) | (G) | (kA/m) | (Oe) |
| Example 1 | 175 | 1750 | 249.9 | 3140 |
| Example 2 | 181 | 1810 | 240.3 | 3020 |
| Comparative Example 1 | 177 | 1770 | 257.0 | 3230 |
| Comparative Example 2 | 175 | 1750 | 255.4 | 3210 |
| Comparative Example 3 | 183 | 1830 | 250.7 | 3150 |
| Comparative Example 4 | 179 | 1790 | 248.3 | 3120 |

TABLE 3

| Examples and Comparative Examples | Kind of ferrite | Properties of resin composition for bonded magnets | | |
|---|---|---|---|---|
| | | MFR (g/10 min) | Molding density (g/cm$^3$) | Water content (ppm) |
| Example 3 | Example 1 | 45 | 3.52 | 62 |
| Example 4 | Example 2 | 58 | 3.53 | 89 |
| Comparative Example 5 | Comparative Example 1 | 42 | 3.53 | 73 |
| Comparative Example 6 | Comparative Example 2 | 45 | 3.52 | 78 |
| Comparative Example 7 | Comparative Example 3 | 56 | 3.53 | 93 |
| Comparative Example 8 | Comparative Example 4 | 54 | 3.52 | 82 |

| Examples and Comparative Examples | Properties of resin composition for bonded magnets | | | |
|---|---|---|---|---|
| | Br | | bHc | |
| | (mT) | (G) | (kA/m) | (Oe) |
| Example 3 | 272 | 2720 | 201.3 | 2530 |
| Example 4 | 274 | 2740 | 195.8 | 2460 |
| Comparative Example 5 | 272 | 2720 | 203.7 | 2560 |
| Comparative Example 6 | 273 | 2730 | 202.9 | 2550 |
| Comparative Example 7 | 274 | 2740 | 196.6 | 2470 |
| Comparative Example 8 | 275 | 2750 | 196.6 | 2470 |

TABLE 3-continued

| Examples and Comparative Examples | Properties of resin composition for bonded magnets | | | |
|---|---|---|---|---|
| | iHc | | BHmax | |
| | (kA/m) | (Oe) | (kJ/m³) | (MGOe) |
| Example 3 | 259.4 | 3260 | 14.72 | 1.85 |
| Example 4 | 252.3 | 3170 | 14.96 | 1.88 |
| Comparative Example 5 | 265.0 | 3330 | 14.72 | 1.85 |
| Comparative Example 6 | 261.8 | 3290 | 14.80 | 1.86 |
| Comparative Example 7 | 257.8 | 3240 | 14.96 | 1.88 |
| Comparative Example 8 | 254.6 | 3200 | 15.04 | 1.89 |

TABLE 4

| Examples and Comparative Examples | Resin composition for bonded magnets | Injection moldability Injection pressure (kg/cm²) | Properties of test piece molded product | |
|---|---|---|---|---|
| | | | Tensile elongation (%) | Tensile strength (MPa) |
| Example 5 | Example 3 | 1853 | 7.21 | 62 |
| Example 6 | Example 4 | 1744 | 8.32 | 63 |
| Comparative Example 9 | Comparative Example 5 | 1873 | 4.73 | 60 |
| Comparative Example 10 | Comparative Example 6 | 1911 | 4.95 | 62 |
| Comparative Example 11 | Comparative Example 7 | 1778 | 5.90 | 60 |
| Comparative Example 12 | Comparative Example 8 | 1792 | 5.78 | 59 |

| Examples and Comparative Examples | Properties of test piece molded product | | |
|---|---|---|---|
| | Flexural strength (MPa) | IZOD (kJ/m²) | Shrinkage rate (%) |
| Example 5 | 123 | NB | 0.622 |
| Example 6 | 125 | NB | 0.671 |
| Comparative Example 9 | 119 | NB | 0.642 |
| Comparative Example 10 | 120 | NB | 0.635 |
| Comparative Example 11 | 120 | NB | 0.683 |
| Comparative Example 12 | 118 | 22.89 | 0.691 |

*NB: Not Break

As shown in Table 4, it was confirmed that the test piece molded products obtained in the Examples had large tensile elongation values and exhibited excellent tensile elongation, as compared to those of the test piece molded products obtained in the Comparative Examples.

The resin composition for bonded magnets according to the present invention is excellent in tensile elongation. As shown in Table 4, the tensile strength of the resin composition for bonded magnets according to the present invention is preferably 40 to 70 MPa, and the tensile elongation thereof is preferably not less than 3% and more preferably 6 to 10%. Further, the resin composition for bonded magnets according to the present invention is excellent in mechanical strength, and is preferably free from being broken even when subjected to impact test using the IZOD impact strength as shown in Table 4. In addition, the resin composition for bonded magnets according to the present invention is excellent in dimensional stability, and as shown in Table 4, the shrinkage rate thereof is preferably not more than 0.68% and more preferably not more than 0.65%.

INDUSTRIAL APPLICABILITY

Since the bonded magnet produced by using the ferrite particles and/or the resin composition for bonded magnets according to the present invention has a large tensile elongation as well as excellent flexural strength and magnetic properties, the ferrite particles and/or the resin composition according to the present invention can be suitably used as ferrite particles and/or a resin composition for bonded magnets, in particular, as those for a magnet roll.

The invention claimed is:

1. A process for producing ferrite particles comprising:
   (a) blending and mixing raw material particles at a predetermined mixing ratio;
   (b) calcining the resulting mixed raw material particles from (a) at a temperature of 900 to 1250° C. in atmospheric air;
   (c) subjecting the particles obtained from (b) to pulverization and washing with water;
   (d) subjecting the resulting particles from (c) to annealing heat treatment at a temperature of 700 to 1100° C. in atmospheric air;
   (e) subjecting the obtained particles from (d) to compaction and grinding; and
   (f) subjecting the obtained particles from (e) to deaggregation treatments, wherein the ferrite particles have an average particle diameter of 0.9 to 2.0 µm.

2. The process for producing ferrite particles according to claim 1, wherein the ferrite particles have a bulk density of not less than 0.5 g/cm³ and less than 0.6 g/cm³ and a degree of compaction of not less than 65%.

3. The process for producing ferrite particles according to claim 1, wherein the ferrite particles are magnetoplumbite-type ferrite particles.

4. The process for producing ferrite particles according to claim 1, wherein a coercive force Hc of the ferrite particles is 206.9 to 279 kA/m (2600 to 3500 Oe) and the ferrite particles are magnetoplumbite-type ferrite particles.

* * * * *